H. M. CROUSE & G. G. NEWELL.
AUTOGRAPHIC REGISTER.
APPLICATION FILED JUNE 5, 1915.

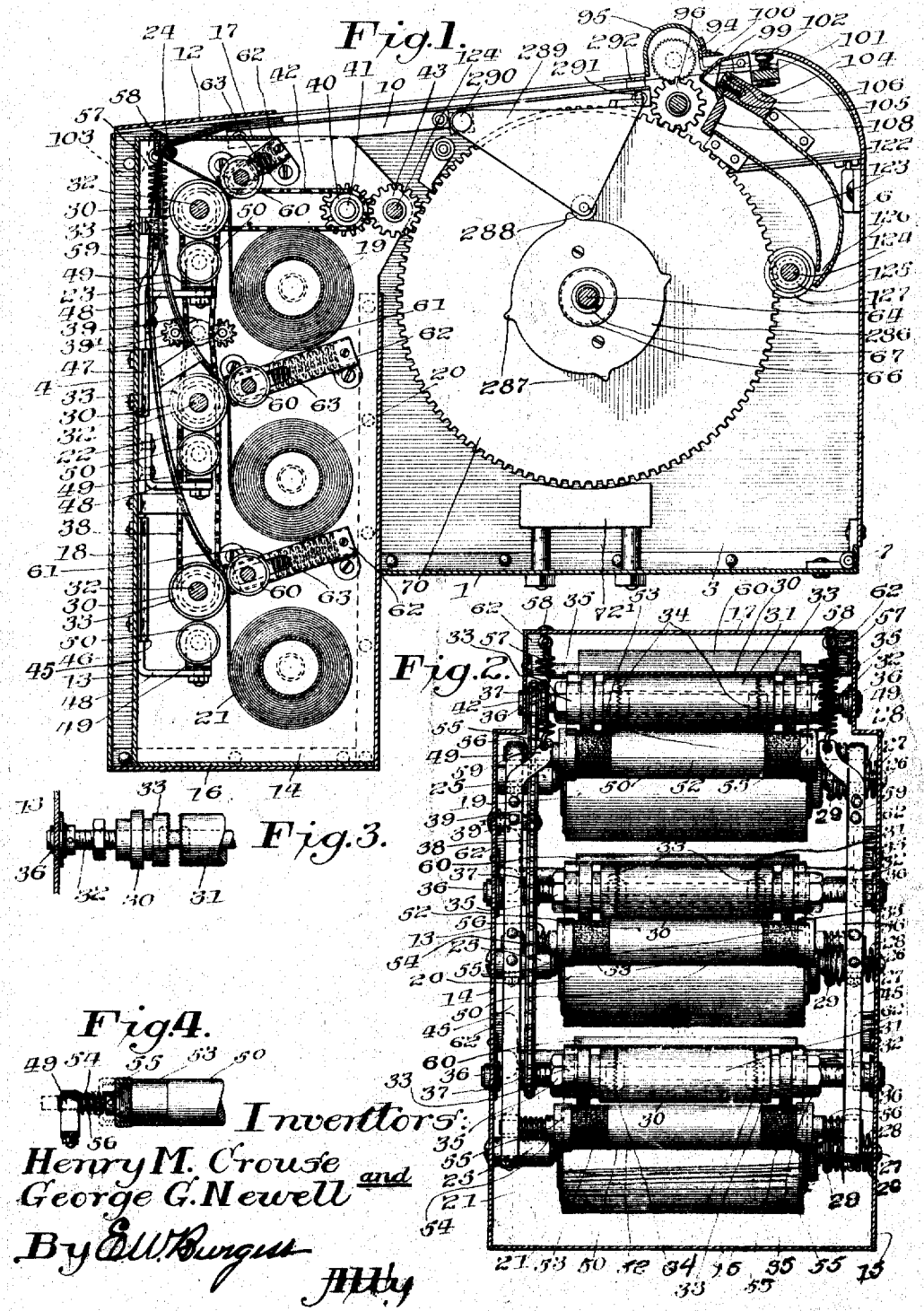

1,254,988.

Patented Jan. 29, 1918.
9 SHEETS—SHEET 2.

Inventors:
Henry M. Crouse,
and George G. Newell
By E. W. Burgess
Atty

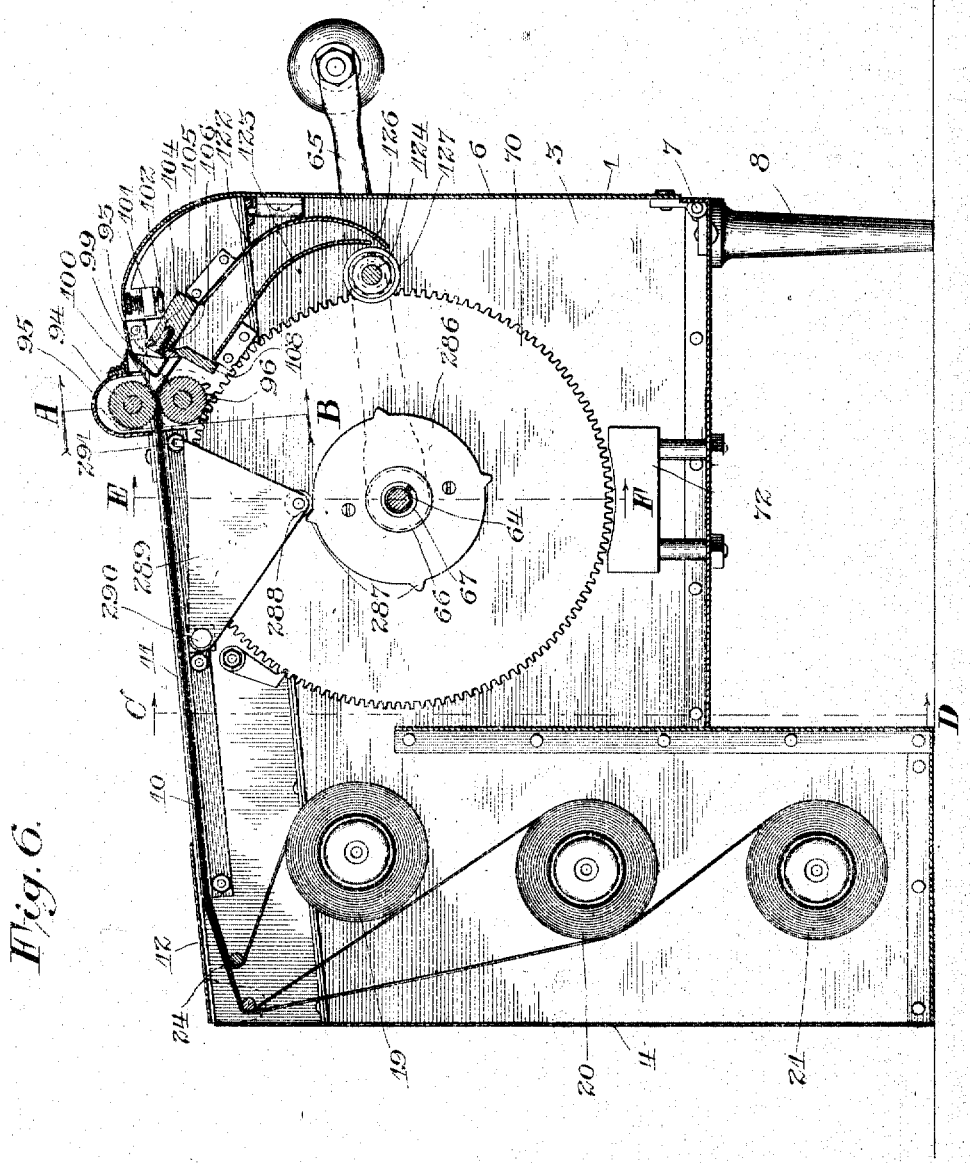

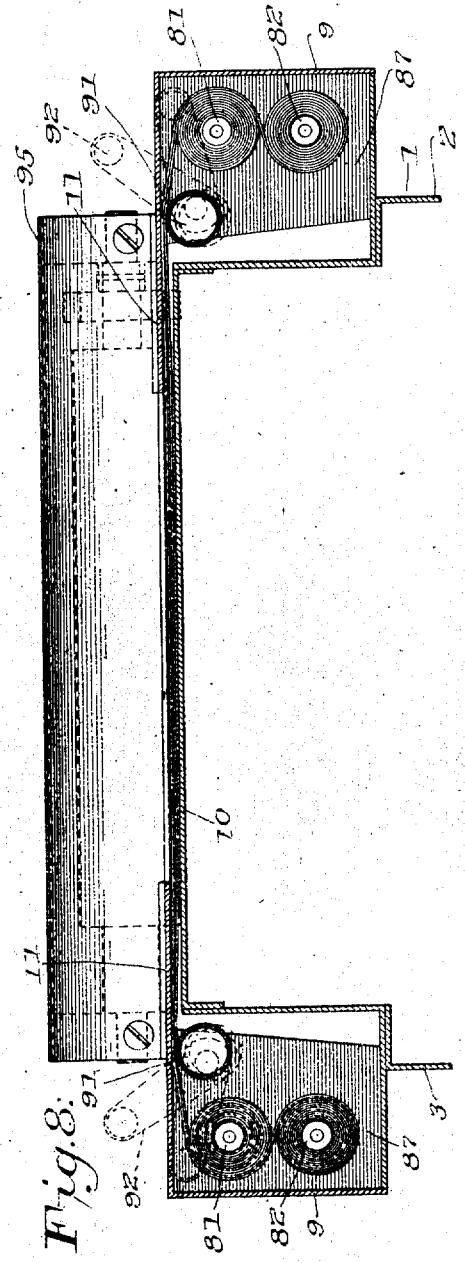

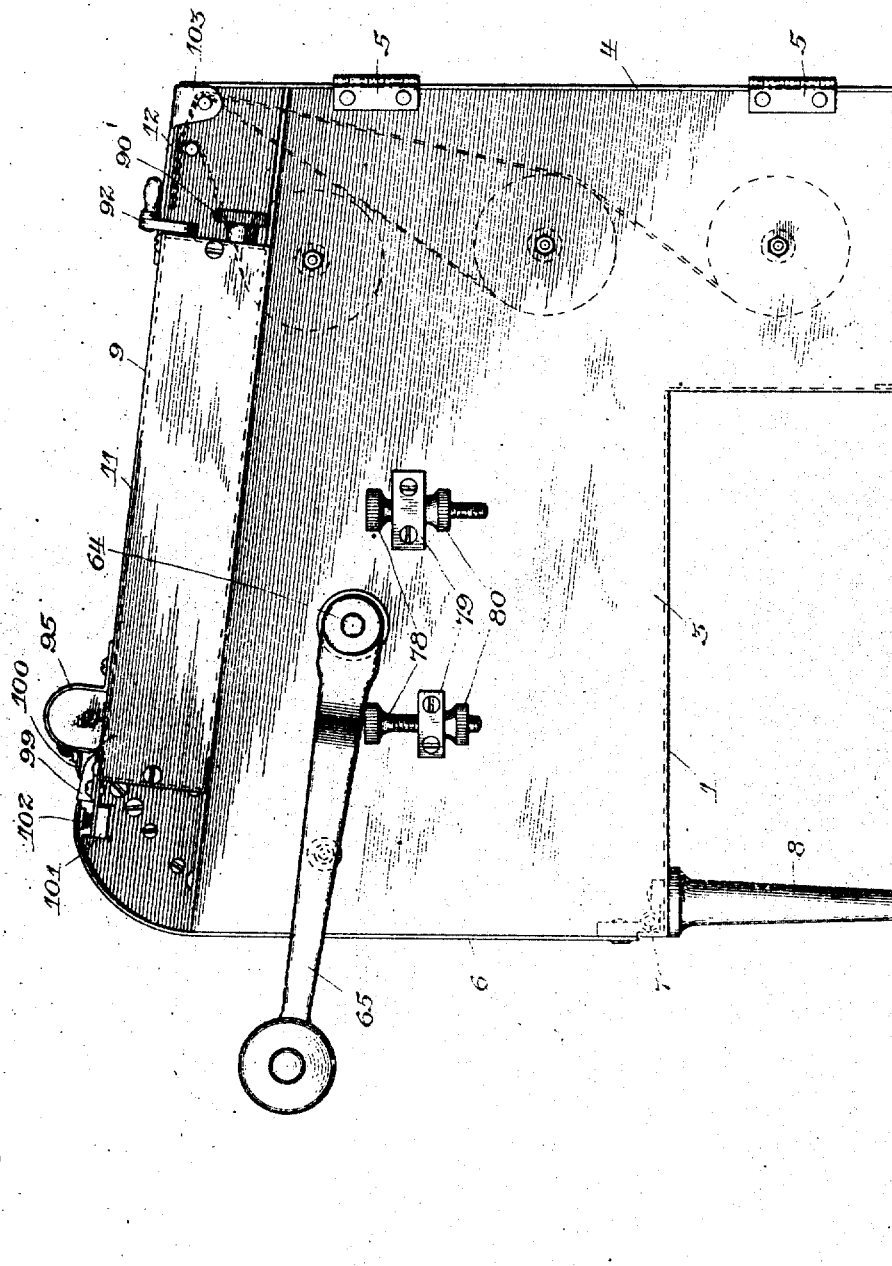

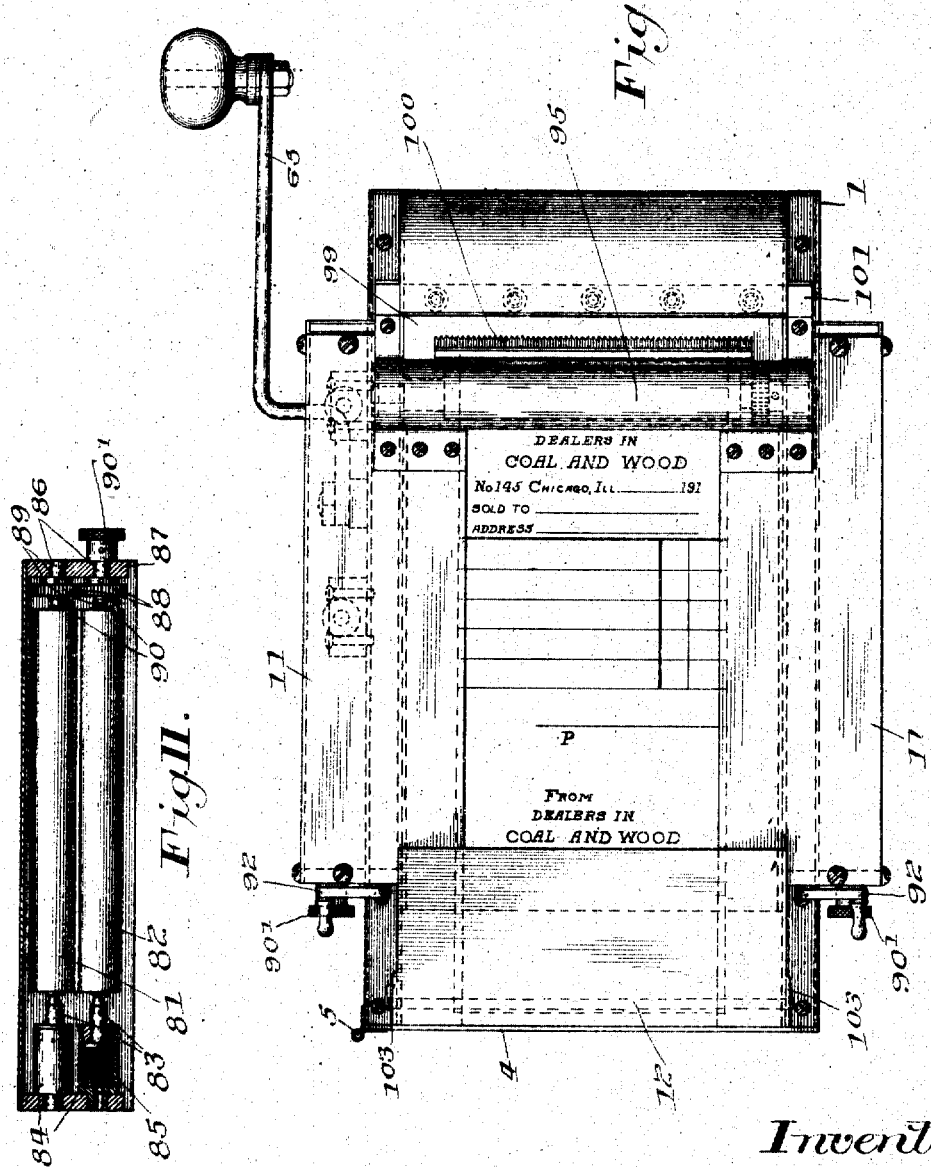

H. M. CROUSE & G. G. NEWELL.
AUTOGRAPHIC REGISTER.
APPLICATION FILED JUNE 5, 1915.

1,254,988.

Patented Jan. 29, 1918.
9 SHEETS—SHEET 7.

Inventors:
Henry M Crouse
and George G. Newell,
By E. W. Burgess
Atty.

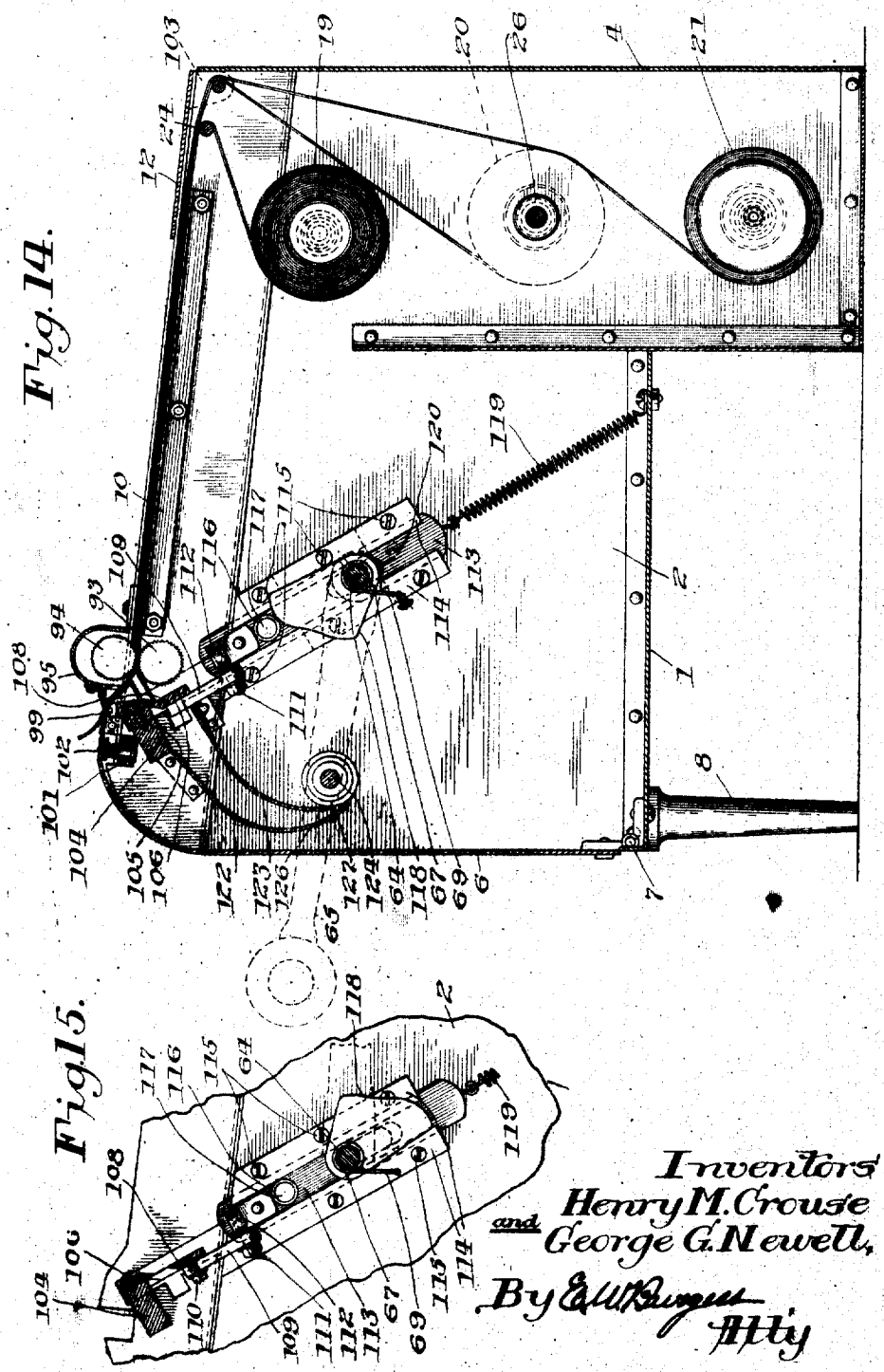

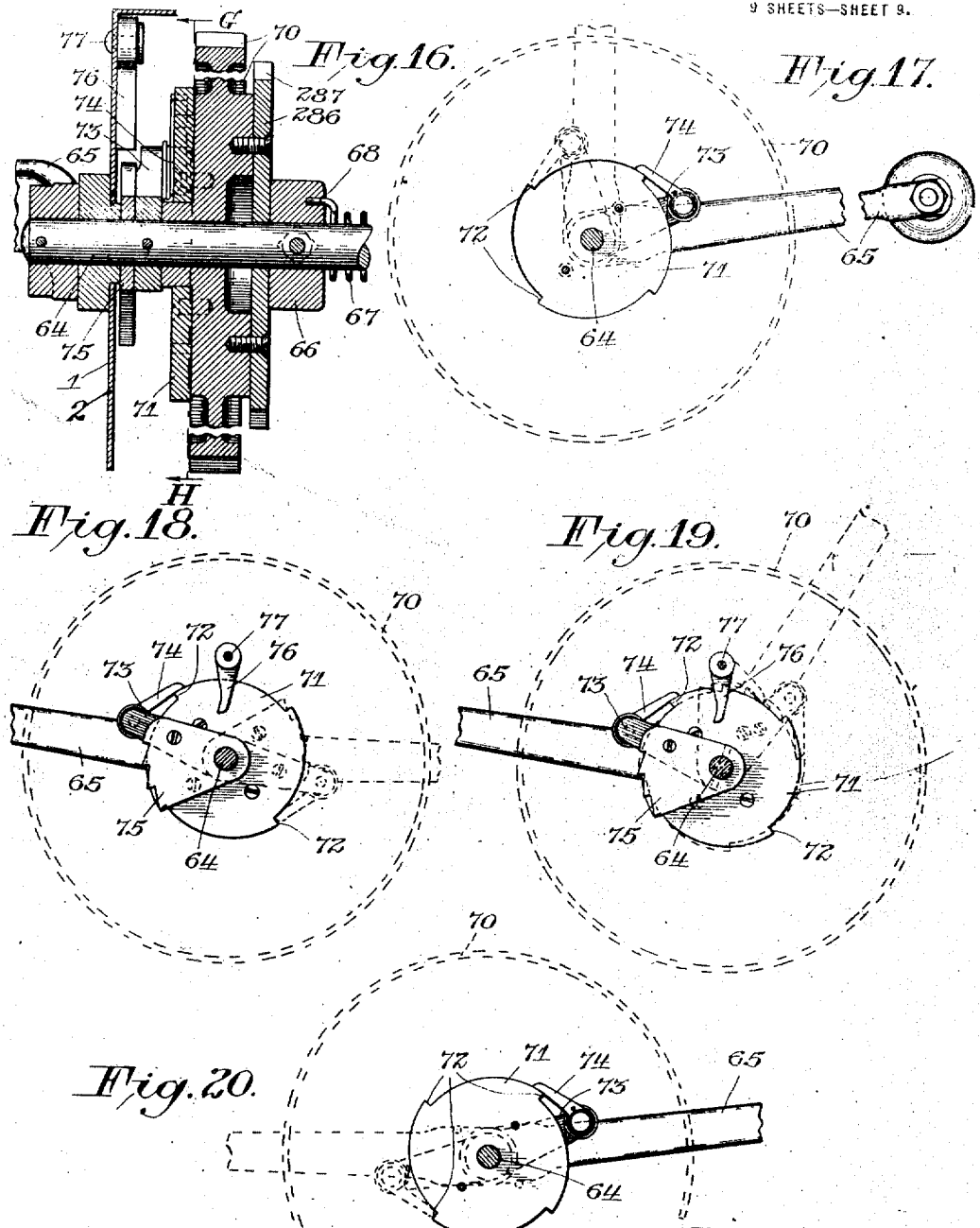

UNITED STATES PATENT OFFICE.

HENRY M. CROUSE AND GEORGE G. NEWELL, OF CHICAGO, ILLINOIS.

AUTOGRAPHIC REGISTER.

1,254,988.    Specification of Letters Patent.    Patented Jan. 29, 1918.

Application filed June 5, 1915. Serial No. 32,293.

*To all whom it may concern:*

Be it known that we, HENRY M. CROUSE and GEORGE G. NEWELL, citizens of the United States, residing at Chicago, in the county of Cook and State of Illinois, have invented certain new and useful Improvements in Autographic Registers, of which the following is a specification.

Our invention relates to what are termed autographic registers and, in common with this class of machines, comprises a casing in which are journaled a plurality of rolls of paper ribbons, the ends of which are brought together in superposed relation and carried over a plate, with manifolding material interposed between the ribbons, the plate being accessible for writing, whereby the words or characters written upon the upper and exposed sheet will be autographically transferred to the sheets underneath the same. The ends of these ribbons are then simultaneously withdrawn a suitable distance and detached in some manner, this operation providing the desired completed papers, in duplicate, triplicate or more, and leaving the ends of the ribbons in position for the next succeeding and corresponding operation.

As is well-known, these ribbons of paper are generally provided each in the form of a series of printed blanks, with spaces to be filled in by writing, and it is essential that the blanks upon the several ribbons register with each other, and that the distance through which the ribbons are drawn for the purpose of detaching the completed document be accurately measured, else the next succeeding printed blanks will not be properly positioned for the following operation.

One of the objects of our invention is to provide a lever throw mechanism that will be accurate in operation and produce a positive measured throw of the operative parts of the mechanism.

Another object of our invention is to provide means whereby each printed blank upon each ribbon will have the number of the machine, the department in which it is located, the class of goods or other insignia printed upon it by the machine to enable the auditor to properly check the records of the machine; to provide means whereby the rolls of ribbons may be adjusted in a manner to cause the printing to be accurately placed upon the blanks relative to the space to be written upon; to provide means for automatically detaching one or more of the record slips and conducting them to the interior of the casing free from any possible mutilation by the operator; to provide means for adjusting the range of angular movement in opposite directions of the lever and for controlling the measured throw of the machine, and to lock it against a reverse movement when it has been moved forward a predetermined distance to carry the ribbons through the machine and before it has completed its full throw in that direction and thereby operated the record slip severing mechanism; to provide a removable casing in which are mounted the rolls of paper ribbons, and the inking, type and pressure rolls in a manner whereby a fresh supply of material may be quickly placed in the machine; to provide simple and efficient means for transmitting motion from the actuating lever arm to the other operative parts of the mechanism, and efficient means for applying spring pressure to the frictional feed rollers in a manner to cause them to advance the material in an even and relatively positive manner.

We attain these objects by means of the mechanism illustrated in the accompanying drawings, in which—

Figure 1 is an open side elevation of part of the mechanism of an autographic register embodying our invention;

Fig. 2 is a front elevation of a removable case carrying the rolls of paper ribbons, the inking and the type and pressure rolls and a part of the actuating mechanism;

Fig. 3 is a detail part of the mechanism designed to illustrate the construction of the type carrying rolls;

Fig. 4 is a detached detail part of the mechanism designed to illustrate the construction of the type inking rolls;

Fig. 6 is an open side elevation of the register designed to illustrate the manner of mounting and guiding the ribbons of paper through the machine;

Fig. 7 is a front sectional elevation of Fig. 6 along lines A—B, designed to illustrate the manner of mounting and driving the frictional feed rolls;

Fig. 8 is a cross section of the top of the register casing in front of the feed rolls, designed to illustrate the manner of mounting and controlling the position of the manifolding material;

Fig. 9 is a side elevation of the register, showing the actuating lever arm and the manner of adjusting the range of its angular movement in opposite directions;

Fig. 10 is a top plan view of the complete register part of the mechanism;

Fig. 11 is a sectional elevation of part of the case upon opposite sides thereof and illustrating the manner of mounting the rollers carrying the carbon paper or other manifolding material;

Fig. 14 is an open side elevation of the register, showing the operation of the ribbon shearing blade actuating mechanism, and the record feed roll;

Fig. 15 is a detached part of Fig. 14, showing the blade actuating mechanism in its retracted position;

Fig. 16 is a vertical cross section of part of Fig. 6 along line E—F and designed to illustrate the manner of connecting other parts of the mechanism with the actuating lever arm;

Fig. 17 is a side elevation of part of Fig. 16 along line G—H and designed to illustrate the construction of the clutch connection between the actuating lever arm and the main motion transmitting gear;

Fig. 18 is a detached detail of the mechanism similar to Fig. 17 and designed to illustrate the operation of the lever locking mechanism;

Fig. 19 is a similar view showing the coacting parts in different positions of their movements;

Fig. 20 is a view like Fig. 17 and designed to illustrate the range of movement of the actuating lever arm.

Figure 5:
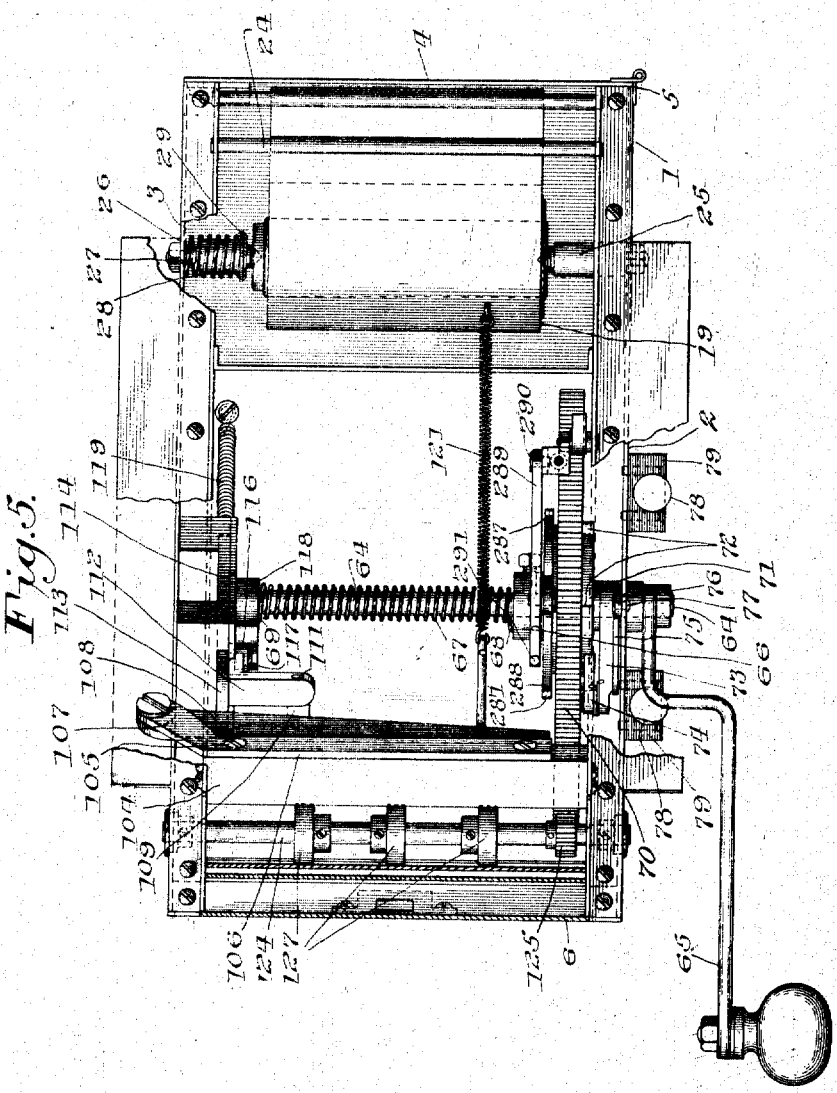
Fig. 5 is a top plan view of part of the register mechanism with a portion of the case removed.
Figure 12:
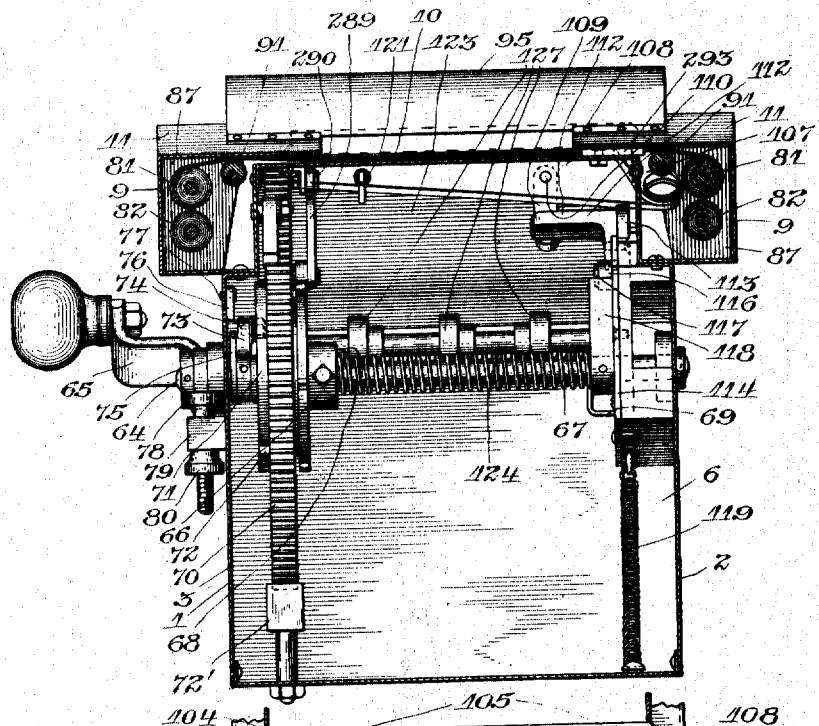
Fig. 12 is a vertical cross section of Fig. 6 along line C—D, designed to illustrate the record shearing mechanism.
Figure 13:
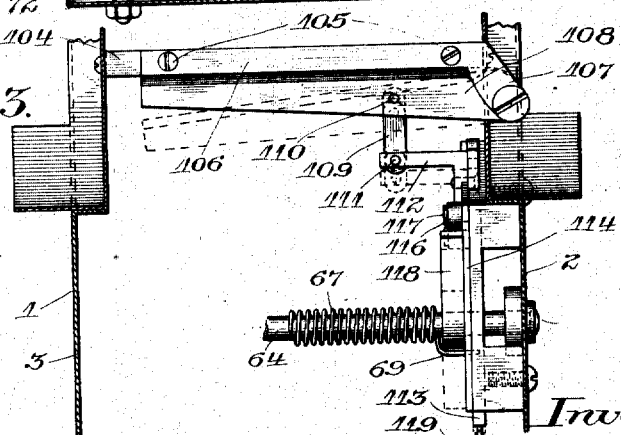
Fig. 13 is a detached part of Fig. 12, showing the position of the ribbon severing blades and their controlling elements at the beginning and completion of their operative movements.

Referring to the drawings, wherein the same reference numerals designate like parts throughout the several views, 1 represents a rectangular case having left and right-hand side walls 2 and 3, respectively, a laterally swinging door 4, connected to the side 3 by means of hinges 5, closes the front of the case, and a vertically swinging door 6, having its lower side connected with the case by means of hinges 7, closes the rear end of the case. The doors are provided with suitable securing locks. The bottom of the case is raised at its rear end, leaving a well-like receptacle at the front of the case, the bottom of which forms a support, and the rear end of the case may be supported by means of legs 8, or the machine may be mounted upon rails permitting it to be moved along the counter. The top of the case is preferably inclined downward toward its front end and is provided with laterally extending longitudinally disposed boxes 9 upon its opposite sides, and includes a depressed rectangular writing plate 10 centrally disposed below the side marginals 11 and front marginal 12 of the top of the case. 13 represents a separate case having left and right-hand side walls 14 and 15 and bottom and top walls 16 and 17, respectively, front marginal walls 18, and open at its rear side. The case 13 fits within the front of the case 1, and in it is mounted a series of, preferably, three paper carrying rolls disposed in a vertical plane, and spaced apart, the upper roll being designated by 19, the central by 20, and the lower by 21. The paper ribbon from roll 21 is led upward over a guide plate 22 secured to the front marginal members of the case, and that from roll 20 over a similar guide plate 23, the ribbons from the three rolls being carried over a guide roll 24 journaled at the top of the case and across the plate 10. The ribbon carrying rolls are journaled at one end upon fixed studs 25 secured to the wall 14 of the case, and at their opposite ends upon spring-pressed journal members 26 that are longitudinally movable upon studs 27 secured to the side wall 15 of the case, and 28 represents coiled compression springs interposed between the wall and collar members 29 upon the journal members and operative to yieldingly hold them in engagement with the rolls in a manner permitting a ready removal of the rolls when the paper is exhausted. 30 represents type carrying rolls having central cylindrical ribbon feeding portions 31 secured to axial shafts 32, and type carrying sleeve members 33 loosely mounted upon the shafts at opposite ends of the cylindrical portions and having clutch teeth 34 upon their inside ends that are adapted to engage with corresponding clutch teeth upon the adjacent ends of the cylindrical ribbon feeding portions 31, and 35 represents securing nuts threaded upon the axial shafts 32 whereby the type carrying sleeve members 33 may be adjusted rotatably upon the shafts in order to properly gage the operation of the printing mechanism relative to the blanks upon the ribbons of paper. The ends of the axial shafts 32 are journaled in bearing blocks 36 secured to the side walls of the case. 37 represents sprocket wheels secured to the shafts adjacent the bearing blocks upon the wall 14, and 38 a sprocket chain operatively engaging with the three wheels, it being held in engagement with the central wheel by means of a yoke member 39 secured to the side wall 14 and having chain engaging pressure rollers 39¹ journaled thereon. 40 represents a combined sprocket wheel and pinion journaled upon a stud 41 secured to the side wall 14, and operatively connected with the upper sprocket wheel 37 by means of a chain 42, and with a driving pinion 43 journaled upon a shaft journaled in the side walls 14 and 15. 45 represents vertically disposed parallel bars upon opposite sides of the case, having their lower ends slidably mounted between ways 46, and their middle portions between ways 47 secured to the front marginal walls of the case, and secured to the bars are L-shaped bracket members 48 that extend inward from the front, and secured to their rear ends are bearing blocks 49, in which are journaled inking rollers 50 that are parallel with the type carrying rolls 30 and in axial alinement therewith in a vertical plane.

The central portions 52 of the inking rolls are cylindrical and engage frictionally with the central portions of the type rolls and are rotated therewith. At opposite ends of their central portions the rolls are reduced in diameter, and sections of felt tubing 53 are placed thereon in position to engage with the type carried by the sleeve members 33 as the coacting parts are simultaneously rotated. The journal members 54 of the inking rolls include threaded cup-shaped members 55 that are screwed upon the reduced ends of the body portions of the rolls and against the ends of the felt tubing in a manner to secure them in position, and 56 represents coiled compression springs carried by the journal members and reacting between the bearing blocks 49 and the cup-shaped members to yieldingly hold the rolls against longitudinal displacement and permit an endwise movement of the rolls by the operator to release one of the journals from its bearing block and thereby permit a ready removal of the rolls from the case when desired. To yieldingly hold the inking rolls in frictional engagement with the type rolls, we provide tension springs 57, having their upper ends connected with the top wall of the case by means of hooks 58, and their lower ends to the converging part 59 of members 48 secured to the upper ends of the bars 45. 60 represents pressure rolls operating radially upon the type rolls 30, and journaled in bearing blocks 61 slidably mounted in barrel members 62 that are secured to the side walls of the case, and 63 represents coiled compression springs carried by the barrel members and reacting between an end wall thereof and the bearing blocks 61 in a manner to yieldingly move the pressure rolls toward the axis of the type rolls in a manner to press upon the ribbon of paper that is drawn between them and cause it to receive an impression from the type. 64 represents a rock-shaft journaled in bearings secured to the side walls 2 and 3 of the register case and having an actuating lever arm 65 secured to its extended end beyond the side wall 2. Secured to the shaft 64 within the case is a collar 66, and 67 represents a torsional spring encircling the shaft, having one end 68 connected with the collar and its opposite end 69 connected with a fixed part of the machine; the spring being operative to rock the shaft and lever arm away from the front of the machine. Loosely mounted upon the shaft between the side wall 2 and the collar 66 is a spur gear member 70 that meshes with the driving pinion 43, and secured to the outside face of the gear member is a circular plate 71 having ratchet teeth 72 upon its periphery disposed at angles of ninety degrees apart, and 72¹ represents a curved shield at the bottom of the wheel and secured to the bottom of the case. 73 represents an arm secured to the shaft adjacent the outside end of the hub of the gear member 70 and having a spring-pressed pawl 74 pivotally mounted upon its free end and adapted to engage with the ratchet teeth 72 upon the plate 71 during a part of the movement of the lever arm 65 in a forward direction. Secured to the arm 73 is a ratchet toothed sector 75, and 76 represents a pawl actuated by gravity pivoted upon a stud 77 secured to the side 2 of the case and adapted to engage with the toothed sector when the lever 65 has been rotated through a predetermined angle in a forward direction in a manner to lock the lever against a reverse movement until its full forward throw has been completed and the free end of the pawl has swung below the path of movement of the teeth upon the sector, and then when the lever has been released from the hand of the operator the force of the spring 67 will return it to its initial position. 78 represents adjustable stop members comprising threaded screws that are received by blocks 79 secured to the side 2 of the case upon opposite sides of the axis of the lever arm 65 and adapted to limit the movement of the lever in opposite directions, the screws having locking nuts 80 below the blocks.

Mounted within the boxes 9 upon opposite sides of the top of the case are two pairs of rollers carrying a supply of carbon paper or other manifolding material, each pair including upper and lower rolls 81 and 82 respectively (Fig. 11). At one end the rolls are journaled upon spring-pressed bolts 83 movable longitudinally in cylindrical shell members 84 secured to the end wall of the box and carrying compression springs 85, and at their opposite ends upon rotatable studs 86 journaled in a bearing block 87 secured to the wall of the box at its opposite end. 88 represents pinions integral with the studs 86 and engaging with each other in a manner to rotate in opposite directions. Each pinion carries a laterally extending stud member 89 that engages with radially disposed studs 90 carried by the rolls and operative to cause the rolls to rotate with the pinions but permitting a limited independent rotation of the rolls in an opposite direction. The rotatable studs 86 upon opposite sides of the machine, upon which the rolls 82 are journaled, are each provided with knurled hand wheels $90^1$ whereby the rolls may be rotated as desired. The compression springs 85 permit the rolls to be moved longitudinally in a manner whereby they may be disengaged from their bearings and removed from and replaced in the boxes as desired. The lower carbon ribbon is wound upon one of the upper rollers 81 and then drawn across the plate 10 over the ribbon of paper led from the upper supply roll and under the marginal plates 11 and 12, and is then wound upon the other roll 81. The other carbon ribbon is wound upon one of the lower rolls 82 and led over the adjacent upper roll and over the ribbon of paper leading from the middle supply roll and under the marginal plates 11 and 12 of the top of the machine, and is then wound upon the other roller 82 upon the opposite side of the machine.

91 represents pressure and tension rolls journaled eccentrically in the end walls of the boxes 9 below the carbon sheets leading from the upper rolls and adjacent the upper walls of the boxes and adapted to press the sheets against the walls and frictionally hold them taut across the plate 10; and 92 represents cranks secured to the extended ends of the journals at their front ends that may be manipulated to rock the rolls in opposite directions in a manner to release or secure the manifolding material. 93 represents one of the paper feed rolls journaled transversely of the machine in rear of the plate 10 and in bearings secured to the side plates 2 and 3 of the register. 94 represents an opposing and coacting feed roll journaled in bearings carried by the upper ends of the marginal members 11 of the upper wall of the case, and 95 represents a hood covering the upper surface of the roll and secured to the marginal members. The rolls 93 and 94 are corrugated, or otherwise roughened, longitudinally upon their peripheries to enable them to act aggressively and positively in their operation of feeding the paper through the machine. The roll 93 is provided at one end with a pinion 96 that meshes with the spur gear member 70, and at its opposite end with a pinion 97 that meshes with a corresponding pinion 98 carried by the coacting roll 94, whereby the rolls are caused to rotate in opposite directions at equal peripheral speeds. 99 represents a transversely disposed paper guiding member in rear of the feed rolls, having its opposite ends secured to the side walls 2 and 3 and its body inclined forward and downward toward the axis of the lower roll, and then downward and rearward toward the bottom of the case. Secured to the rear wall of the hood 95 is a transversely disposed paper tearing blade 100, serrated upon its rear edge and spaced apart from the paper guiding member 99. 101 represents a transversely disposed bar having its opposite ends secured to the rear ends of the marginal members 11 of the upper wall of the case in rear of and spaced apart from the edge of the tearing blade. 102 represents a series of spring-pressed bolts carried by the bar and adapted to engage with the upwardly and forwardly curved end of the door 6 closing the rear end of the case. The top of the case carrying the upper paper feed roll, the plate 10, and the carbon supply rolls, is hingedly connected at its front end with the side walls 2 and 3 of the case, preferably by means of depending ear members 103 integral with the marginal member 12. When in closed position the upper end of the door 6 engages with the upper ends of the spring-pressed bolts 102, thereby causing said bolts to yieldingly resist an upward swing of the top of the case and a separation of the feed roll 94 from the opposing feed roll 93.

In the machine as illustrated, one or more of the paper ribbons (see Fig. 14) may be delivered from the feed rolls 93 and 94 upward and over the inclined guiding member 99 and below the tearing blade 100 in position to be grasped by the hand of the operator and severed by pulling them upward against the blade 100. The lower ribbon as it is delivered from the feed rolls engages with the rearwardly inclined lower part of the guiding member 99 and is thereby directed to a shearing mechanism including a transverse bar 104, having its opposite ends secured to the side walls 2 and 3 of the case and having secured to its front edge, by means of screws 105; a stationary shearing blade 106, having one end 107 extended beyond the wall 3 of the case and inclined forward and downward, and 108 represents a vibratable shearing blade pivotally connected with the part 107 of the fixed blade. 109 represents a link having its upper end pivotally connected with the movable shearing blade at 110, and its lower opposite end with a pin 111 carried by an inwardly extending arm 112 integral with a bar 113 slidably mounted between ways 114 inclining forwardly and downwardly and secured to the side wall 3 of the case by means of screws 115. 116 represents a roller journaled upon an inwardly extending stud 117 secured to the bar and adapted to be engaged by a wiper arm 118 secured to the rock shaft 64 in a manner to operate the shearing mechanism to sever the record slip as the lever arm 65 reaches the limit of its forward movement, and 119 represents a coiled tension spring having one end secured to the lower end of the bar 113 and its opposite end to the bottom of the case and operative to return the bar and movable shearing blade to their initial positions when the rock shaft 64 and lever 65 have been returned to their initial positions; the bar 113 being provided with an elongated opening 120 that receives the shaft 64, and 121 represents a supplemental tension spring mechanism connecting the free end of the movable shearing blade 108 with a fixed part of the machine in a manner to hold the blades in close shearing relation. In its passage rearward between the shearing blades the record slip is directed downward by engagement with the lower surface of the inclined transverse bar 104 and a downwardly and forwardly curved plate 122, having its opposite ends secured to the side walls of the case, and 123 represents a lower supplemental guiding plate spaced apart from plate 122 at its upper end and converging in close proximity at its lower end with the plate 122 extending beyond plate 123, and 124 represents a record slip feeding roll, having its opposite ends journaled in bearings secured to the side walls 2 and 3 of the case and including a pinion 125 meshing with the spur gear member 70, whereby a rotative movement is transmitted to the feed roll in a direction to move the slips downward through the gap 126 between the lower ends of the slip guiding plates 122 and 123 and a series of collars 127, spaced apart and having bands of rubber upon their peripheries that oppose the plate 122 and engage more or less aggressively with the severed record slips from a single ribbon and cause them to be directed downward and fall in the receiving chamber face down consecutively and in sequential relation.

The type carrying rolls 30 of the register are spaced apart vertically, and the pressure rolls 60 of the mechanism are so located as to cause an impression of the type upon the paper ribbons at equal distances apart and corresponding with the length of the printed blanks upon the ribbons. The feed rolls 93 and 94 have equal diameters, the dimensions of which, and their driving pinions as actuated by the lever 65, give a measured length of ribbon drawn across the writing platen of the machine equal to the length of the printed blanks, and the range of throw of the lever 65 may be regulated in order to produce an accurate and positive throw of the ribbons at each operation thereof.

Secured to the spur gear member 70 adjacent the collar 66, secured to the shaft 64 of the register, is a disk 286 having a series of teeth 287, spaced apart upon its periphery and adapted to engage with a roller 288 journaled upon a swinging triangular plate member 289, pivoted at 290 upon the top wall of the register case and carrying a perforating punch 291 that coöperates with a die 292 carried by the writing plate 10, in a manner to perforate the record slips for filing purposes, if desired. The plate 10 is provided with a marginal adjustable guide 293 to secure the ribbons against lateral displacement.

In the operation of our register, one or more copies may be severed from the ribbons and retained within the register case, or all of the copies may be delivered outside the case without interfering with any other operation of the machine; also the machine may be operated with a single ribbon of paper, dispensing with carbon copies, if desired; or it may be operated with as many ribbons as can be manipulated to receive good impressions from the manifolding material. The only change necessary in the mechanism to obtain more than three copies being an extra set of parts for each copy required, including rolls of ribbons and the necessary printing mechanism, and an adjustment of the driving sprocket chain.

Some of the advantages of providing means whereby the department number or class of goods and the machine number are printed upon the record slips, are a stock of printed rolls for various departments may be secured and kept in supply in relation to the amount of checks used for a certain period for the whole house and not kept in relation to the needs of each department, thus obviating the danger of being out of a supply for one or more departments. Also a record can be kept of the first and last check number on each serial roll each day, thus enabling the auditor to trace and obtain the machine copy of any check at once if only the check number and serial number are available. Each serial number would be recorded as being placed in a certain department on a certain date, and thus the last check used be posted each day. As each machine would be located in a certain department, subject only to removal with the knowledge of the auditor, the trouble of wrong books being used in any department would be obviated. Instead of supplies reaching a certain department with reference only for use in such department, they only become such department checks when delivered from the machine. In order to facilitate the transfer of clerks from department or stock to another, the only requirement to make proper distribution of clerks' sales is that the clerks put their full clerk numbers on the checks. General merchandise stores, by the use of these machines, can keep their sales accounts by classification of goods or departments automatically by posting the sales from a register placed in each class of goods, all the requirement being that checks be made out for goods sold only on the register placed for that purpose. Department stores in the same manner can keep accurate accounts of sales by stock, thus subdividing automatically each department for an analysis of results. The serial and check number if placed on delivery tickets, and if entered as passing through shipping room, on trip sheet, will furnish a positive clue to the tracing of any check wanted on complaint or for any other reason. All indexes, and the clerk's trouble in entering, footing, etc., and the work of collecting books and indexes, will be eliminated. When the store closes all the records, represented at present by books and indexes, are safely locked up.

In case of a missing check for a cash sale instead of an index entry—which may be wrong—there is an exact copy of each check for charge sale instead of a missing charge book or a lost tissue from the book if wanted to trace a missing check—we have a positive knowledge that we have a copy of every check made out. There will be no possibility of missing records, as the care of the collection of records will be under the supervision of the auditor. Clerks will not have to hunt a book when sales are made, the machine being close at hand where it cannot be hidden, and the trouble caused by clerks using each others' books will be done away with, as the checking will be done against the serial and check number of the machine rolls. There will be a saving in stationery, as each roll will be used up completely, whereas books become torn or mutilated, and when nearly used up are not reissued to clerks.

The record slips being severed instead of being rolled with the ribbon intact, removes the inconvenience and impracticability of checking from a continuous roll; the slips being deposited in consecutive sequence in the case of the machine, they would not have to be sorted before use, but could be bound together in some way to keep the order of consecutive sequence.

Having shown and described a preferred form of our invention, we do not desire that it be limited by the precise details of its construction as illustrated, it being understood that many changes may be made both in its form and proportioning of its parts without departing from the spirit of our invention.

The register described has other than store uses. Instance the following: Bankers in making out drafts will have drafts in triplicate, the original to be signed, the duplicate to keep a record, thus doing away with both the entries now made, the triplicate for audit and the total amount of drafts drawn always available, with an itemized record of each amount. Business firms can use this machine for drawing checks on their bank account, the original for issue, the duplicate to replace the work and trouble and risk of error in making out stubs, and the triplicate for audit. The total checks drawn always available with itemized list and a quick bank balance at any time. In the same manner express companies can issue receipts and railroad companies bills-of-lading in triplicate with the protection afforded by the machine, and extra entries of transactions be done away with, all this being done at one writing. Receipts for registered mail, if made in triplicate, would also be safeguarded. These are only a few instances of the uses to which this combination can be put.

What we claim as our invention, and desire to secure by Letters Patent, is:

1. An autographic register including, in combination, a case having side and bottom walls, a cover for said case having its front end hingedly connected therewith and including a writing plate, a paper feeding roller journaled upon the opposite end of said cover in rear of said writing plate, and a coacting paper feeding roller journaled in the side walls of said case below said first mentioned roller.

2. An autographic register including, in combination, a case having side and bottom walls, a cover for said case having its front end hingedly connected therewith and including a writing plate, a paper feeding roller journaled upon the opposite end of said cover in rear of said writing plate, a coacting paper feeding roller journaled in the side walls of said case below said first mentioned roller, and a spring mechanism operative to yieldingly press the upper feeding roller toward the opposing roller.

3. An autographic register including, in combination, a case having side and bottom walls, a cover for said case having its front end hingedly connected therewith and including a writing plate, a paper feeding roller journaled upon the opposite end of said cover in rear of said writing plate, a coacting paper feeding roller journaled in the side walls of said case below said first mentioned roller, and a spring mechanism carried by said cover and coöperating with the case to yieldingly hold the cover in a closed position.

4. An autographic register including, in combination, a case, a writing plate, printing mechanism, means for supporting a supply of paper, a measured throw mechanism operative to move the paper across said plate and operatively connected with said printing mechanism, and means for regulating the throw of said paper moving mechanism.

5. An autographic register including, in combination, a case, a writing plate carried thereby, means for supporting a supply of paper within said case, printing mechanism, feeding mechanism for drawing the paper across said plate and operatively connected with said printing mechanism, said feeding mechanism including a rock shaft journaled in said case, an actuating crank secured to said shaft, and stop members carried by said case and engaging with said crank in a manner to limit the throw thereof in opposite directions.

6. An autographic register including, in combination, a case, a writing plate carried by said case, means for supporting a supply of paper within said case, printing mechanism, feeding mechanism for drawing the paper across said plate, said feeding mechanism including a rock shaft journaled in said case, an actuating lever arm secured to said shaft and having a measured throw, a gear wheel journaled upon said shaft and having a ratchet wheel secured thereto, a pawl carrying arm secured to said shaft, a spring-pressed pawl carried by said arm and adapted to engage with said ratchet wheel, and gear connections between said gear wheel and said paper feeding and printing mechanisms.

7. An autographic register including, in combination, a case, a writing plate carried by said case, means for supporting a supply of paper within said case, a feeding mechanism for drawing the paper across said plate, said mechanism including a rock shaft journaled in said case, an actuating lever arm secured to said shaft and having a measured throw, a gear wheel journaled upon said shaft and having a ratchet wheel secured thereto, a pawl carrying arm secured to said shaft, a spring-pressed pawl carried by said arm and adapted to engage with said ratchet wheel, means for locking said actuating lever against a reverse movement until it has completed a measured throw, and gear connections between said gear wheel and said paper feeding mechanism.

8. An autographic register including, in combination, a case, a writing plate carried by said case, a source of paper supply rolls journaled within said case, a feeding mechanism for drawing the paper across said plate, said mechanism including a rock shaft journaled in said case, an actuating lever arm secured to said shaft and having a measured throw, a gear wheel journaled upon said shaft and having a ratchet wheel secured thereto, said gear wheel being operatively connected with said paper feeding mechanism, a pawl carrying arm secured to said shaft, a spring-pressed pawl carried by said arm and adapted to engage with said ratchet wheel, means for locking said actuating lever against a reverse movement until it has completed a measured throw, said means including a ratchet sector carried by said shaft, and a pawl pivoted on a fixed part of the machine and adapted to engage with the teeth on said sector.

9. An autographic register including, in combination, a case, a writing plate carried by said case, means for supporting a supply of paper within said case, printing mechanism, feeding mechanism for drawing the paper across said plate and operatively connected with said printing mechanism, said feeding mechanism including a rock shaft journaled in said case, a torsional spring encircling said shaft having one end connected therewith and its opposite end with a fixed part of the mechanism in a manner to rock said shaft in one direction, an actuating lever secured to said shaft and having a measured throw, a gear wheel journaled upon said shaft, a ratchet wheel secured to said gear wheel, a pawl carrying arm secured to said shaft, a spring-pressed pawl carried by said arm and adapted to engage with the teeth upon said ratchet wheel, and operative connections between said gear wheel and said paper feeding mechanism.

10. An autographic register including, in combination, a case, a writing plate carried by said case, means for supporting a supply of paper within said case, feeding mechanism for drawing the paper across said plate, said mechanism including a pair of opposing coacting feed rolls having intermeshing pinions secured thereto whereby said rolls are rotated in opposite directions, a rock shaft journaled in said case, a spring encircling said shaft and having one end connected therewith and its opposite end with a fixed part of the mechanism in a manner to rock said shaft in one direction, an actuating lever arm secured to said shaft and having a measured throw, a gear wheel journaled upon said shaft, a ratchet wheel secured to said gear wheel, a pawl carrying arm secured to said shaft, a spring-pressed pawl carried by said arm and adapted to engage with the teeth upon said gear wheel meshing with one of said feed roll pinions, and operative connections between said gear wheel and said paper feeding mechanism.

11. An autographic register including, in combination, a case having a writing plate upon its upper side, means for feeding a plurality of superposed paper ribbons longitudinally across said plate, a manifolding mechanism coöperating with said plate, said mechanism including ribbon carrying rolls journaled in said case upon opposite side of said plate, ribbon pressing and tensioning rolls journaled eccentrically in said case parallel with and inside of said first mentioned rolls, and crank arms secured to each of said tensioning rolls for positively turning said pressing and tensioning rolls in opposite directions.

12. An autographic register including, in combination, a case having a writing plate upon its upper side, means for feeding a plurality of superposed paper ribbons longitudinally across said plate, a manifolding mechanism coöperating with said plate, said mechanism including a pair of ribbon carrying rolls journaled in said case upon each side of said plate, and manually operable means for turning the rolls of either pair independently of the other and in opposite directions.

13. An autographic register including, in combination, a case having a writing plate upon its upper side, means for feeding a plurality of superposed paper ribbons longitudinally across said plate, a manifolding mechanism coöperating with said plate, said mechanism including a pair of ribbon carrying rolls journaled in said case upon each side of said plate, intermeshing pinions connected with each of said rolls, and a hand wheel connected with one of the pinions on each pair of rolls.

14. An autographic register including, in combination, a case, a writing plate carried by said case, means including a measured throw mechanism for feeding superposed ribbons of paper longitudinally across said plate, means for feeding ribbons of manifolding material transversely across said plate between the ribbons of paper, and means carried by said case and operative to sever record slips from one or more of the paper ribbons, said means including a fixed blade carried by said case and disposed above and transversely of the ribbons of paper beyond the manifolding material, a pivoted coacting blade carried by said case, means for directing one or more of the ribbons of paper between said blades, means actuated by said measured throw mechanism for moving said pivoted blade in a cutting direction to sever record slips from the ribbons of paper, and means for guiding the severed record slips into superposed sequential relation within said case.

15. An autographic register including, in combination, a case, a writing plate carried by said case, means including a measured throw mechanism for feeding superposed ribbons of paper longitudinally across said plate, means for feeding ribbons of manifolding material transversely across said plate between the ribbons of paper, and means carried by said case and operative to sever record slips from one or more of the paper ribbons, said means including a fixed blade carried by said case and disposed above and transversely of the ribbons of paper beyond the manifolding material, a pivoted coacting blade carried by said case, means for directing one or more of the ribbons of paper between said blades, means actuated by said measured throw mechanism for moving said pivoted blade in a cutting direction to sever record slips from the ribbons of paper, and means for guiding the severed record slips into superposed sequential relation within said case, said means including downwardly curved converging plates carried by said case and disposed in rear of said cutting blades and adapted to receive the record slips between them.

16. An autographic register including, in combination, a case, a writing plate carried by said case, means including a measured throw mechanism for feeding superposed ribbons of paper longitudinally across said plate, means for feeding ribbons of manifolding material transversely across said plate between the ribbons of paper, and means carried by said case and operative to sever record slips from one or more of the paper ribbons, said means including a fixed blade carried by said case and disposed above and transversely of the ribbons of paper beyond the manifolding material, a pivoted coacting blade carried by said case, means for directing one or more of the ribbons of paper between said blades, means actuated by said measured throw mechanism for moving said pivoted blade in a cutting direction to sever record slips from the ribbons of paper, means for guiding the severed record slips into superposed sequential relation within said case, said means including downwardly curved converging plates carried by said case and disposed in rear of said cutting blades and adapted to receive the record slips between them, one of said guide plates being extended beyond the other at their delivery ends, and a rotatable feeding roll coöperating with the guide extension.

17. An autographic register including, in combination, a case, a writing plate carried by said case, means including a measured throw mechanism for feeding superposed ribbons of paper longitudinally across said plate, means for feeding ribbons of manifolding material transversely across said plate between the ribbons of paper, and means carried by said case and operative to sever record slips from one or more of the paper ribbons, said means including a fixed blade carried by said case and disposed above and transversely of the ribbons of paper beyond the manifolding material, a pivoted coacting blade carried by said case, means for directing one or more of the ribbons of paper between said blades, means actuated by said measured throw mechanism for moving said pivoted blade in a cutting direction to sever record slips from the ribbons of paper, means for guiding the severed record slips into superposed sequential relation within said case, said means including downwardly curved converging plates carried by said case and disposed in rear of said cutting blades and adapted to receive the record slips between them, one of said guide plates being extended beyond the other at their delivery ends, and a rotatable feeding roll opposing the guide extension, said feeding roll being actuated by said measured throw mechanism.

18. In an autographic register, a writing plate, means for drawing a plurality of webs of paper across said plate, and means intermediate said paper drawing means and said plate for perforating said webs.

19. In an autographic register, a writing plate, means having a measured throw for feeding a web of paper across said plate, paper severing means, and means operatively connected to said feeding means for perforating the unsevered strip at the end of each throw of said feeding means.

20. In an autographic register, a platen paper feeding mechanism including a shaft for feeding the paper across said platen, a toothed disk secured to said shaft, and means located intermediate said platen and the feeding means and including a lever located in the path of said teeth for perforating the web of paper.

21. In an autographic register, a platen, paper feeding means including a shaft, a toothed disk carried by said shaft, means for rotating said shaft, and a plate pivoted to said register having upwardly projecting perforating means intermediate said paper feeding means and platen, said plate being located in the path of said teeth.

22. In an autographic register, paper feeding mechanism including a rock shaft and a lever, and means for locking said lever against reverse movement until it has completed a measured throw, said means including a ratchet sector carried by said shaft and a pawl pivoted on a fixed part of the register and adapted to engage the teeth of said sector.

23. In an autographic register, paper feeding mechanism including a rock shaft and a lever, and means for locking said lever against reverse movement until it has completed a measured throw, said means including a pawl and a ratchet, one of these elements being fixed to the frame of the register and the other being carried by said rock shaft.

24. In an autographic register, a case, a platen, paper feeding means for feeding the paper across said platen, paper severing means, and means for guiding the severed record slips into superimposed sequential relation within said case, said means including downwardly curved converging plates disposed in the rear of said severing means.

25. In an autographic register, a case, a platen, paper feeding means for feeding the paper across said platen, paper severing means, and means for guiding the severed record slips into superimposed sequential relation within said case, said means including downwardly curved converging plates carried by said case and disposed in the rear of said severing means, one of said plates being extended beyond the other at the delivery end, and feeding means coöperating with said extended plate.

26. In an autographic register, a case, a platen, paper feeding means for feeding the paper across said platen, paper severing means, and means for guiding the severed record slips, said means including downwardly curved converging plates disposed in the rear of said paper severing means, one of said plates being extended beyond the other at the delivery end, and a feeding roll coöperating with said extended plate and operatively connected to said paper feeding means.

27. In an autographic register, a case, a platen, means for drawing a plurality of webs of paper across said platen, means intermediate said platen and said drawing means for perforating said webs, and means in the path of said webs and beyond said drawing means for separating the webs whereby certain of said webs will be deflected upwardly out of the register and the remaining webs will remain in said register.

28. In an autographic register, a case, a platen, means for drawing a plurality of webs of paper across said platen, means intermediate said platen and said drawing means for perforating said webs, means in the path of said webs and beyond said drawing means for separating the webs whereby certain of said webs will be deflected upwardly out of the register and the remaining webs will remain in said register, and means carried by said case for severing the webs passing outwardly therefrom.

29. In an autographic register, a case, a platen, means for drawing a plurality of webs of paper across said platen, means intermediate said platen and said drawing means for perforating said webs, means in the path of said webs and beyond said drawing means for separating the webs whereby certain of said webs will be deflected upwardly out of the register and the remaining webs will remain in said register, and means for severing the webs remaining in the case.

30. In an autographic register, a case, a platen, means for drawing a plurality of webs of paper across said platen, means for actuating said paper drawing means, means intermediate said platen and said drawing means for perforating said webs operatively connected to said actuating means, means in the path of said webs and beyond said drawing means for deflecting certain of said webs upwardly out of the case, and means for deflecting the remaining webs downwardly into said case.

31. An autographic register including, in combination, a platen, paper feeding means for feeding the paper across said platen, printing rolls, means for rotating said printing rolls simultaneously with said paper feeding means, means for causing the paper to engage the printing rolls at each actuation of said feeding means, and means for adjusting said printing rolls rotatably on their axes independent of said rotating means.

32. An autographic register including, in combination, a platen, paper feeding means for feeding the paper across said platen, printing rolls, means for rotating said printing rolls simultaneously with said paper feeding means, means for causing the paper to engage the printing rolls at each actuation of said feeding means, and means including interengaging clutch teeth for adjusting said printing rolls rotatably on their axes independent of said rotating means.

33. An autographic register including, in combination, a platen, paper feeding means for feeding paper across said platen, a shaft, printing rolls loosely carried thereby, collars secured to said shaft and having clutch teeth, said printing rolls having oppositely extending clutch teeth in coacting relation therewith, means for holding said collars and printing rolls into engagement with each other, and means for rotating said printing rolls simultaneously with said paper feeding means.

HENRY M. CROUSE.
GEORGE G. NEWELL.